United States Patent
Choi et al.

(10) Patent No.: US 9,263,712 B2
(45) Date of Patent: Feb. 16, 2016

(54) SECONDARY BATTERY PACK WITH IMPROVED SAFETY

(75) Inventors: Jong Woon Choi, Cheongju-si (KR); Hyung Ku Yun, Daejeon (KR); Ju Hwan Baek, Cheongwon-gun (KR); Tae Wook Kim, Cheongwon-gun (KR)

(73) Assignee: LG CHEM, LTD., Seoul (KR)

( * ) Notice: Subject to any disclaimer, the term of this patent is extended or adjusted under 35 U.S.C. 154(b) by 552 days.

(21) Appl. No.: 13/450,961

(22) Filed: Apr. 19, 2012

(65) Prior Publication Data

US 2013/0034752 A1 Feb. 7, 2013

(30) Foreign Application Priority Data

Aug. 4, 2011 (KR) .................. 10-2011-0077903

(51) Int. Cl.
| | |
|---|---|
| *H01M 2/00* | (2006.01) |
| *H01M 10/04* | (2006.01) |
| *H01M 2/02* | (2006.01) |
| *H01M 2/10* | (2006.01) |
| *H01M 10/42* | (2006.01) |
| *H01M 2/04* | (2006.01) |

(52) U.S. Cl.
CPC ............ *H01M 2/0267* (2013.01); *H01M 2/022* (2013.01); *H01M 2/0404* (2013.01); *H01M 2/1061* (2013.01); *H01M 10/425* (2013.01); *H01M 10/0436* (2013.01); *H01M 2010/4278* (2013.01); *H01M 2200/00* (2013.01); *H01M 2200/106* (2013.01); *H01M 2220/30* (2013.01); *Y10T 29/49108* (2015.01)

(58) Field of Classification Search
CPC .......... H01M 10/0436; H01M 10/425; H01M 2010/4278; H01M 2200/00; H01M 2200/106; H01M 2220/30; H01M 2/022; H01M 2/0267; H01M 2/0404; H01M 2/1061
USPC ......... 429/122, 136, 156, 162, 163, 178, 179; 29/623.1
See application file for complete search history.

(56) References Cited

U.S. PATENT DOCUMENTS

| | | | |
|---|---|---|---|
| 6,225,778 B1 * | 5/2001 | Hayama et al. ............... | 320/112 |
| 6,368,744 B1 | 4/2002 | Hatazawa et al. | |
| 2004/0067415 A1 | 4/2004 | Lai | |
| 2005/0181242 A1 | 8/2005 | Suzuki et al. | |
| 2005/0208346 A1 * | 9/2005 | Moon et al. ...................... | 429/7 |

(Continued)

FOREIGN PATENT DOCUMENTS

| CN | 1665380 A | 8/2005 |
|---|---|---|
| CN | 101312237 A | 11/2008 |

(Continued)

*Primary Examiner* — Carlos Barcena
(74) *Attorney, Agent, or Firm* — Birch, Stewart, Kolasch & Birch, LLP (57) ABSTRACT

Disclosed is a secondary battery pack including an anode terminal of a battery cell, the anode terminal being made of a plate-shaped conductive member, the anode terminal being electrically connected to a protection circuit module (PCM) via a safety element, a cathode terminal of the battery cell, the cathode terminal being made of a plate-shaped conductive member, the cathode terminal being directly electrically connected to the PCM, a battery cell having the anode terminal and the cathode terminal formed at one end thereof, the battery cell being provided at the end thereof with a thermally welded surplus portion, and a PCM including a printed circuit board (PCB) having a protection circuit formed thereon.

17 Claims, 5 Drawing Sheets

(56) References Cited

U.S. PATENT DOCUMENTS

| | | |
|---|---|---|
| 2006/0035141 A1 | 2/2006 | Lee |
| 2009/0130494 A1 | 5/2009 | Jang |
| 2011/0086242 A1 | 4/2011 | Lee |
| 2011/0171498 A1 | 7/2011 | Baek |
| 2011/0171506 A1 | 7/2011 | Nozawa et al. |
| 2012/0070702 A1 | 3/2012 | Byun et al. |
| 2012/0257349 A1 | 10/2012 | Bang et al. |
| 2013/0034752 A1 | 2/2013 | Choi et al. |
| 2015/0287964 A1 | 10/2015 | Park et al. |

FOREIGN PATENT DOCUMENTS

| | | |
|---|---|---|
| CN | 101540380 A | 9/2009 |
| CN | 202930460 U | 5/2013 |
| JP | 2000-156208 A | 6/2000 |
| JP | 2001-256937 A | 9/2001 |
| JP | 2002-184372 A | 6/2002 |
| JP | 2005-129442 A | 5/2005 |
| JP | 2005-166644 A | 6/2005 |
| JP | 2006-12769 A | 1/2006 |
| JP | 2008-293940 A | 12/2008 |
| JP | 2009-70736 A | 4/2009 |
| JP | 2010-108754 A | 5/2010 |
| JP | 2011-82136 A | 4/2011 |
| KR | 10-0889624 B1 | 3/2009 |
| KR | 10-0943579 B1 | 2/2010 |
| KR | 10-2010-0121336 A | 11/2010 |
| KR | 10-2011-0066774 A | 6/2011 |
| KR | 10-2011-0082747 A | 7/2011 |
| TW | 551621 U | 9/2003 |
| TW | M249224 U | 11/2004 |
| TW | I281280 A | 5/2007 |
| TW | 201008004 A1 | 2/2010 |
| TW | M374655 U1 | 2/2010 |
| TW | I345850 B | 7/2011 |
| WO | WO 2011/078536 A2 | 6/2011 |

\* cited by examiner

SECONDARY BATTERY PACK WITH IMPROVED SAFETY

TECHNICAL FIELD

The present invention relates to a secondary battery pack with improved safety, and, more particularly, to a secondary battery pack including an anode terminal of a battery cell, the anode terminal being made of a plate-shaped conductive member, the anode terminal being electrically connected to a protection circuit module (PCM) via a safety element, a cathode terminal of the battery cell, the cathode terminal being made of a plate-shaped conductive member, the cathode terminal being directly electrically connected to the PCM, a battery cell having the anode terminal and the cathode terminal formed at one end thereof, the battery cell being provided at the end thereof with a thermally welded surplus portion, and a PCM including a printed circuit board (PCB) having a protection circuit formed thereon, the PCB being provided at one side thereof with a cathode terminal connection portion and a safety element connection portion and at the other side thereof with an external input and output terminal connection portion, an external input and output terminal electrically connected to the protection circuit of the PCB via the external input and output terminal connection portion of the PCB, and a first case and a second case coupled to each other through an assembly type fastening structure to cover the PCB and the safety element, the PCM being loaded on the thermally welded surplus portion of the battery cell in a state in which the PCM is electrically connected to the safety element and the battery cell.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent preservation and service-life characteristics, which has been widely used as an energy source for various electronic products as well as mobile devices.

However, various kinds of combustible materials are contained in the lithium secondary battery. As a result, the lithium secondary battery may be heated or explode due to the overcharge of the battery, the overcurrent in the battery, or other physical external impact. That is, the safety of the lithium secondary battery is very low. Consequently, safety elements, such as a positive temperature coefficient (PTC) element and a protection circuit module (PCM), to effectively control an abnormal state of the lithium secondary battery, such as the overcharge of the lithium secondary battery or the overcurrent in the lithium secondary battery, are loaded on the lithium secondary battery in a state in which the safety elements are connected to a battery cell.

Generally, the PCM is connected to the battery cell via conductive nickel plates by welding or soldering. That is, the nickel plates are connected to electrode tabs of the PCM by welding or soldering, and then the nickel plates are connected to corresponding electrode terminals of the battery cell by welding or soldering. In this way, the PCM is connected to the battery cell to manufacture a battery pack.

It is required for the safety elements, including the PCM, to be maintained in electrical connection with the electrode terminals of the battery cell and, at the same time, to be electrically isolated from other parts of the battery cell. Consequently, an insulation tape is generally bonded to the PCM excluding electrode terminal connection regions thereof to maintain electrical insulation, thereby achieving such connection.

In this case, however, it is difficult for the safety elements to immediately sense the temperature of the battery cell due to the insulation tape, and, in addition, mechanical strength of the safety elements against external impact is low.

Also, if a plurality of insulative mounting members or a plurality of parts is used to solve the above-mentioned problems, a battery pack assembly process is complicated. When a large number of welding or soldering processes are carried out to configure the battery pack, the welding or soldering processes must be carried out with high precision because of the small structure of the secondary battery. As a result, defect possibility is great.

Therefore, there is a high necessity for a technology that is capable of stably coupling members mounted to the upper end of a battery cell and, at the same time, of simplifying an assembly process and improving safety of the battery cell.

DISCLOSURE

Technical Problem

Therefore, the present invention has been made to solve the above problems, and other technical problems that have yet to be resolved.

Specifically, it is an object of the present invention to provide a secondary battery pack having a stable assembly structure obtained using a simplified assembly process while maintaining mechanical strength and electrical insulation.

Technical Solution

In accordance with one aspect of the present invention, the above and other objects can be accomplished by the provision of a secondary battery pack including an anode terminal of a battery cell, the anode terminal being made of a plate-shaped conductive member, the anode terminal being electrically connected to a protection circuit module (PCM) via a safety element, a cathode terminal of the battery cell, the cathode terminal being made of a plate-shaped conductive member, the cathode terminal being directly electrically connected to the PCM, a battery cell having the anode terminal and the cathode terminal formed at one end thereof, the battery cell being provided at the end thereof with a thermally welded surplus portion, and a PCM including a printed circuit board (PCB) having a protection circuit formed thereon, the PCB being provided at one side thereof with a cathode terminal connection portion and a safety element connection portion and at the other side thereof with an external input and output terminal connection portion, an external input and output terminal electrically connected to the protection circuit of the PCB via the external input and output terminal connection portion of the PCB, and a first case and a second case coupled to each other through an assembly type fastening structure so as to cover the PCB and the safety element, the PCM being loaded on the thermally welded surplus portion of the battery cell in a state in which the PCM is electrically connected to the safety element and the battery cell.

Consequently, in the secondary battery pack according to the present invention, the PCM and the safety element are loaded on the thermally welded surplus portion of the battery cell in a state in which the PCM and the safety element are mounted between the first case and the second case. As compared with a conventional secondary battery pack using an insulation tape, therefore, it is possible to effectively protect the PCM and considerably reduce the number of parts, thereby greatly improving manufacturing processability.

Also, the first case and the second case are coupled to each other through an assembly type fastening structure, and therefore, it is possible to greatly improve process efficiency as compared with a case using an additional adhesive tape.

As defined above, the first case and the second case according to the present invention are separate members which are coupled to each other through an assembly type fastening structure.

In connection with this case, the first case and the second case may be connected to each other via a hinge structure so that the first case and the second case constitute a single unit member. In this case, however, it may be difficult to form the first case and the second case by injection molding due to small size thereof. Also, the strength of a hinge region is relatively low with the result that the first case and the second case may be easily damaged if the present invention is applied to real products. Furthermore, sealability and thus moisture resistance may be lowered due to low fastening force at the hinge region. In addition, the hinge region protrudes outward with the result that the battery cell may be damaged during installation thereof, and the capacity of the battery pack is reduced as compared with battery packs having the same standard since a surplus space is necessary so that the hinge region can protrude.

The assembly type fastening structure of the cases according to the present invention to solve the above problems may be configured so that the first case is provided with at least one fastening hole (or fastening protrusion), through which the first case is coupled to the second case, and the second case is provided with at least one fastening protrusion (or fastening hole) corresponding to the fastening hole (or fastening protrusion) of the first case.

In such a coupling manner, the first case and the second case can be easily assembled and a coupled state between the first case and the second case can be further stably secured. The fastening structure may be constituted, for example, by hooks.

Also, the at least one fastening hole and the at least one fastening protrusion corresponding to the at least one fastening hole are preferably formed at outer circumferential sides of the first and second cases which face each other to achieve uniform coupling force and thus increase sealing force. For example, if the sides of the first and second cases which face each other form a rectangular shape, the at least one fastening hole and the at least one fastening protrusion corresponding to the at least one fastening hole may be formed four sides of the first and second cases. In this structure, it is possible to increase sealing force of the insulative mounting members, thereby improving insulation and safety.

Various kinds of battery cells may be used in the secondary battery pack according to the present invention. The battery cell used in the secondary battery pack according to the present invention may be a pouch-shaped secondary battery, having an electrode assembly of a cathode/separator/anode structure mounted in a battery case made of a laminate sheet including a metal layer and a resin layer in a sealed state, the thickness and weight of which are small.

As defined above, the PCB, having the protection circuit to control overcharge, overdischarge, overcurrent, etc. of the battery, is provided at one side thereof with the cathode terminal connection portion and the safety element connection portion and at the other side thereof with the external input and output terminal connection portion.

Consequently, it is possible to connect the cathode terminal of the battery cell to the cathode terminal connection portion of the PCB without change in shape or without using additional members and to connect one side of the safety element to the safety element connection portion of the PCB located at the same side of the PCM in a state in which the anode terminal of the battery cell is connected to the other side of the safety element. As a result, the safety element, the structural strength is low, is stably mounted on the PCB, thereby reducing a defect rate in a manufacturing process and thus improving manufacturing process efficiency.

The material for the cathode terminal connection portion and the safety element connection portion is not particularly restricted so long as the cathode terminal connection portion and the safety element connection portion are made of a conductive material. Preferably, the cathode terminal connection portion and the safety element connection portion are made of nickel plates.

Also, each of the nickel plates may be configured to have a structure in which one end of each of the nickel plates is perpendicularly bent while the other end of each of the nickel plates is coupled to the rear side of the PCB so that the nickel plates can be easily welded to the cathode terminal and the safety element.

Meanwhile, the safety element is an element, the resistance of which increases with the increase of temperature. Preferably, the safety element is positive temperature coefficient (PTC) element. A connection member coupled to the PTC element serves to interrupt current at the upper end of the battery pack when the temperature of the battery pack abruptly rises due to an internal short circuit or the like. However, the safety element is not limited to the PTC element. For example, a bimetal or a fuse may be used as the safety element.

In a preferred example, the first case or the second case may be provided with an opening, through which the safety element located at the PCM is exposed outward.

The first case and the second case are preferably made of a plastic material in consideration of electrical insulation, manufacturing easiness and manufacturing costs. However, if the safety element is sealed by such a plastic material, it may be difficult the safety element to sensitively react to the change in temperature of the battery cell. On the other hand, it is possible for the safety element to more sensitively react to the safety element through the opening structure as described above. As a result, it is possible to further improve safety of the battery pack. In addition, it is possible to minimize the installation height of the PCB due to installation of the safety element, thereby contributing to the increase in capacity of the battery.

The form of the external input and output terminal is not particularly restricted so long as the external input and output terminal can be electrically connected to the PCB to supply current from an external device, such as a charger, to the battery cell or to supply current from the battery cell to a mobile phone, an mp3 player, etc. Preferably, the external input and output terminal is configured in the form of a wire having a connector mounted to one end thereof.

In another preferred example, a nickel plate may be further mounted to one side of the cathode terminal, which is coupled to the cathode terminal connection portion, by ultrasonic welding. Consequently, it is possible to prevent poor welding due to the difference in properties between the cathode terminal, which is made of aluminum, and nickel.

Meanwhile, the first case and/or the second case may include holes, through which the electrode terminals of the battery cell are inserted, and a hole, through which the external input and output terminal extends outward. In this structure, it is possible to achieve electrical connection in the insulative mounting members while securing insulation from outside Consequently, the PCB and the safety element can be easily coupled to each other in an assembly type manner using the first case and the second case excluding the electrode terminals of the battery cell and the external input and output terminal extending through the holes.

Meanwhile, a label may be attached to the PCM excluding the external input and output terminal and lateral sides and outer sides of the battery cell so as to cover the PCM and the lateral sides and the outer sides of the battery cell. Consequently, it is possible to more stably secure electrical connection between the electrode terminals of the battery cell and the PCB while maintaining an insulated state without using an additional insulation tape.

In a preferred example, the label may be configured to have a sheet structure comprising a first attachment surface to cover one major surface of the battery cell, second and third attachment surfaces extending from the first attachment surface to cover opposite lateral surfaces of the battery cell, and a fourth attachment surface extending from the first attachment surface to cover the PCM.

It is possible for the label having such a unique sheet structure to effectively cover only the necessary portions of the battery cell and to greatly improve manufacturing process efficiency.

In accordance with another aspect of the present invention, there is provided a protection circuit module of a specific structure which is used to constitute the secondary battery pack with the above-stated construction.

Specifically, there is provided a protection circuit module (PCM) to be mounted to the top of a plate-shaped battery cell having electrode terminals made of plate-shaped conductive members formed at an upper end thereof, wherein the PCM includes a printed circuit board (PCB) having a protection circuit formed thereon, an external input and output terminal electrically connected to the protection circuit of the PCB, the PCB being provided at one side thereof with a cathode terminal connection portion and a safety element connection portion and at the other side thereof with an external input and output terminal connection portion, and a first case and a second case coupled to each other through an assembly type fastening structure to cover the PCB and the safety element.

In a general process of assembling a battery pack, a connection member and an F-PCM are coupled, and an insulative tape is attached at each step, so that a PCM assembly is mounted on a battery cell. That is, the PCM assembly is mounted to the battery cell using a large number of parts. Consequently, a large number of processes are required. Also, mechanical strength and structural stability of the battery pack are low.

On the other hand, the protection circuit module according to the present invention is configured to have a structure in which the safety element is connected to the PCM and coupled to the first case and the second case in a state in which the safety element is welded to the anode terminal. Consequently, mechanical strength of the battery pack is very high, and a process of manufacturing the battery pack is greatly simplified.

In a preferred example, the safety element may be configured to have a structure in which one end of the safety element is connected to the safety element connection portion in a state in which the other end of the safety element is connected to the anode terminal of the battery cell.

Also, the cathode terminal connection portion and the safety element connection portion may be configured so that one end of cathode terminal connection portion and one end of the safety element connection portion are perpendicularly bent while the other end of the cathode terminal connection portion and the other end of the safety element connection portion are coupled to a rear side of the PCB.

The first case and/or the second case may be configured to have a structure including holes, through which the electrode terminals of the battery cell are inserted, and a hole, through which the external input and output terminal extends outward.

The first case may be provided with at least one fastening hole (or fastening protrusion), through which the first case is coupled to the second case, and the second case may be provided with at least one fastening protrusion (or fastening hole) corresponding to the fastening hole (or fastening protrusion) of the first case. Also, the at least one fastening hole and the at least one fastening protrusion corresponding to the at least one fastening hole are preferably formed at outer circumferential sides of the first and second cases which face each other to improve fastening force and sealing force.

Preferably, the first case or the second case may be provided with an opening, through which the safety element located at the PCM is exposed outward.

In accordance with a further aspect of the present invention, there is provided a method of manufacturing the secondary battery pack with the above-stated construction.

Specifically, the secondary battery pack according to the present invention may be manufactured using a method of manufacturing a secondary battery pack including (a) connecting a wire type external input and output terminal to an external input and output terminal connection portion formed at a front side of a PCB, (b) connecting a nickel plate to a rear side of a cathode terminal of a battery cell by ultrasonic welding, (c) connecting one end of a safety element to a safety element connection portion formed at a rear side of the PCB, in a state in which the other end of the safety element is connected to a rear side of a cathode terminal of the battery cell, and connecting the cathode terminal to a cathode terminal connection portion, (d) coupling a first case and a second case so that the external input and output terminal extends outward in a state in which a PCM is disposed so that the connection portions are arranged in parallel to the battery cell, thereby assembling the PCM, and (e) bending the electrode terminals of the battery cell and mounting the PCM to a thermally welded surplus portion of the battery cell.

As compared with a method of manufacturing a conventional secondary battery pack, the secondary battery pack manufacturing method according to the present invention can reduce the number of manufacturing processes and provide a battery pack exhibiting high mechanical strength and improved structural stability.

Also, the secondary battery pack manufacturing method according to the present invention may further include attaching a label to the PCM and lateral sides and outer sides of the battery cell so that the label covers the PCM excluding the external input and output terminal and the lateral sides and the outer sides of the battery cell, if necessary.

Advantageous Effects

As is apparent from the above description, the secondary battery pack according to the present invention is configured to have a novel structure in which the PCM including the first case and the second case is loaded on the thermally welded surplus portion of the battery cell. Consequently, the process of manufacturing the secondary battery pack is simplified, and structural stability of the secondary battery pack is improved.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
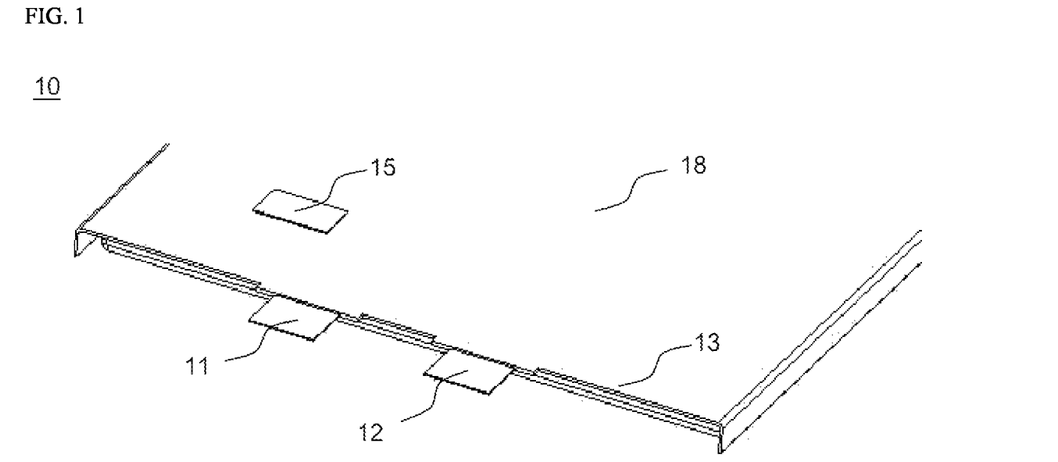
FIG. 1 is a partial perspective view of a battery cell.
Figure 2:
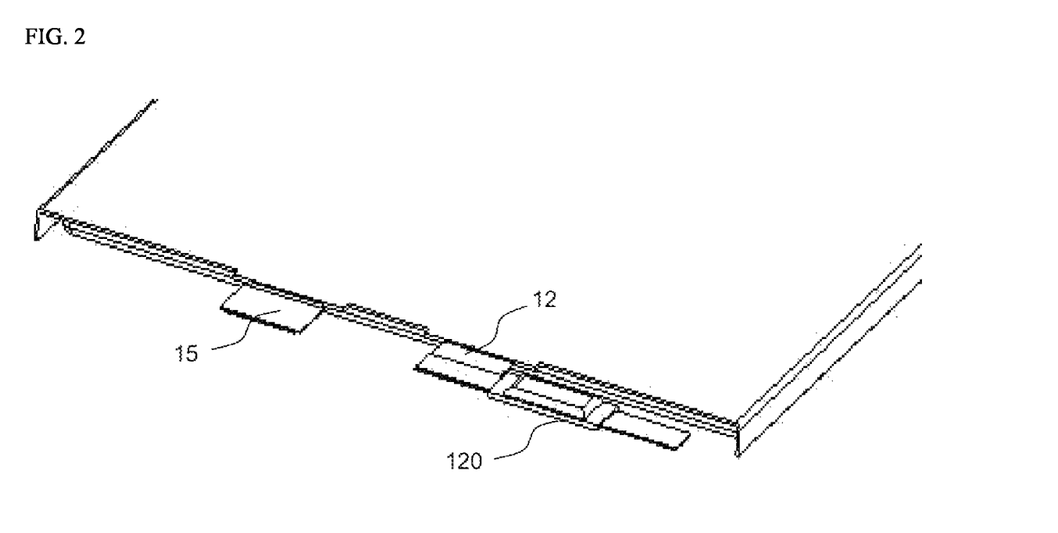
FIG. 2 is a partial perspective view showing a safety element coupled to the battery cell.
Figure 3:
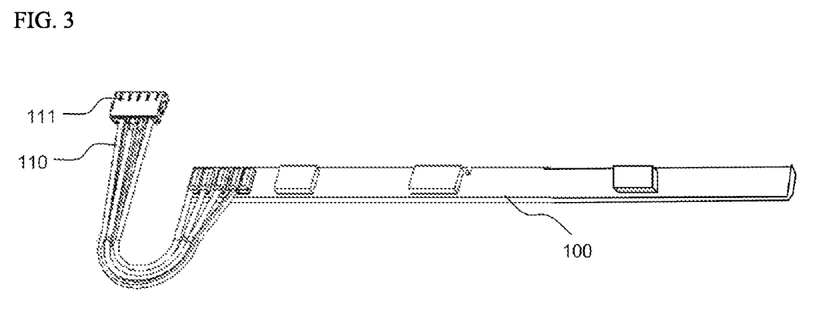
FIG. 3 is a partial perspective view showing an external input and output terminal coupled to a printed circuit board (PCB)
Figure 4:
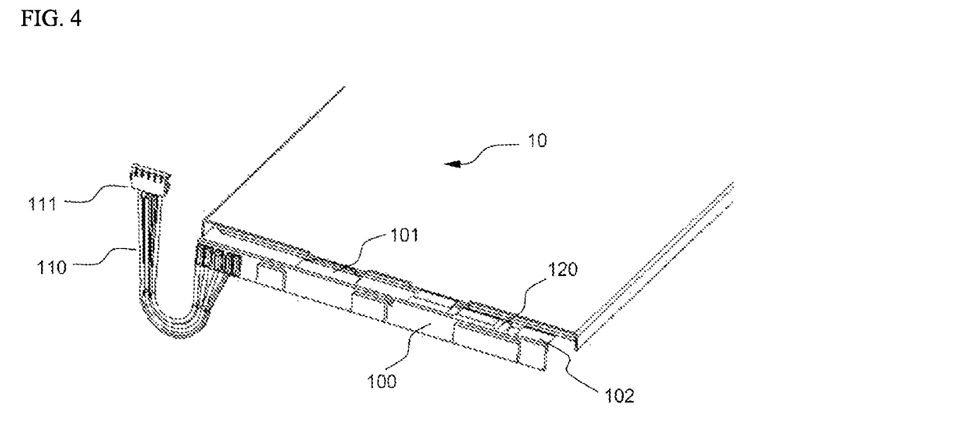
FIG. 4 is a partial perspective view showing the PCB and the safety element coupled to the upper end of the battery cell.

FIG. 1 is a partial perspective view of a battery cell, FIG. 2 is a partial perspective view showing a safety element coupled to the battery cell, FIG. 3 is a partial perspective view showing an external input and output terminal coupled to a printed circuit board (PCB), and FIG. 4 is a partial perspective view typically showing the PCB and the safety element coupled to the upper end of the battery cell.

Referring to these drawings, a battery cell 10 is a plate-shaped battery cell having an anode terminal 12 and a cathode terminal 11 formed at one end thereof. An electrode assembly of a cathode/separator/anode structure is mounted in a battery case 18 made of a laminate sheet including a metal layer and a resin layer in a sealed state.

Reference numeral 13 indicates a thermally welded surplus portion, which is an upper-end sealed portion formed when the battery case 18 is thermally welded in a sealed state.

A nickel plate 15 is further mounted to one side of the cathode terminal 11 of the battery cell 10, which is coupled to a cathode terminal connection portion 101, by ultrasonic welding.

On the other hand, a wire type external input and output terminal 110 having a connector 111 mounted to one end thereof is connected to one side of a PCB 100, and the cathode terminal connection portion 101, which is made of a nickel plate, and a safety element connection portion 102, which is made of a nickel plate, are formed at the other side of the PCB 100 so that the cathode terminal connection portion 101 and the safety element connection portion 102 correspond to the cathode terminal 11 and a safety element 120, respectively.

As shown in FIG. 4, one end of the connection portion 101 and one end of the connection portion 102 are perpendicularly bent while the other end of the connection portion 101 and the other end of the connection portion 102 are coupled to the rear side of the PCB 100. Consequently, the connection portions 101 and 102 can be easily welded to the cathode terminal 11 and the safety element 120, respectively. The safety element 120 may be a positive temperature coefficient (PTC) element.

Figure 5:
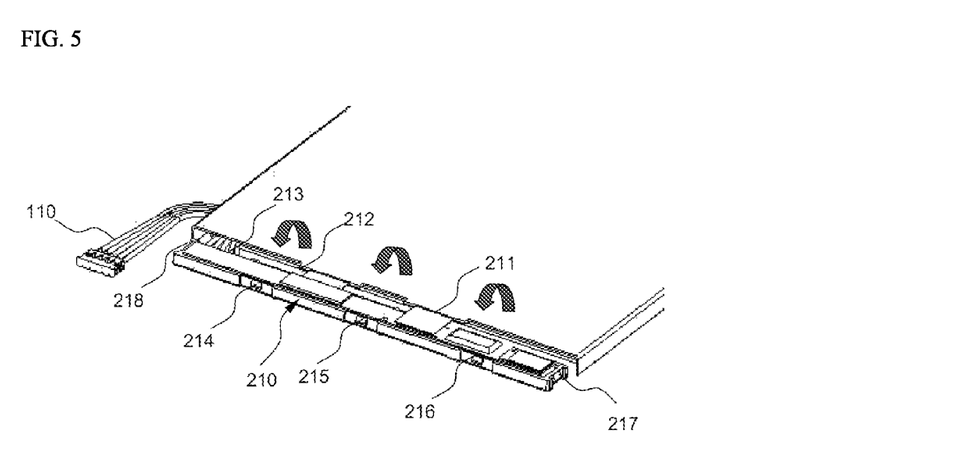
FIG. 5 is a partial perspective view showing the PCB and the safety element of FIG. 4 mounted to a second case.
Figure 6:
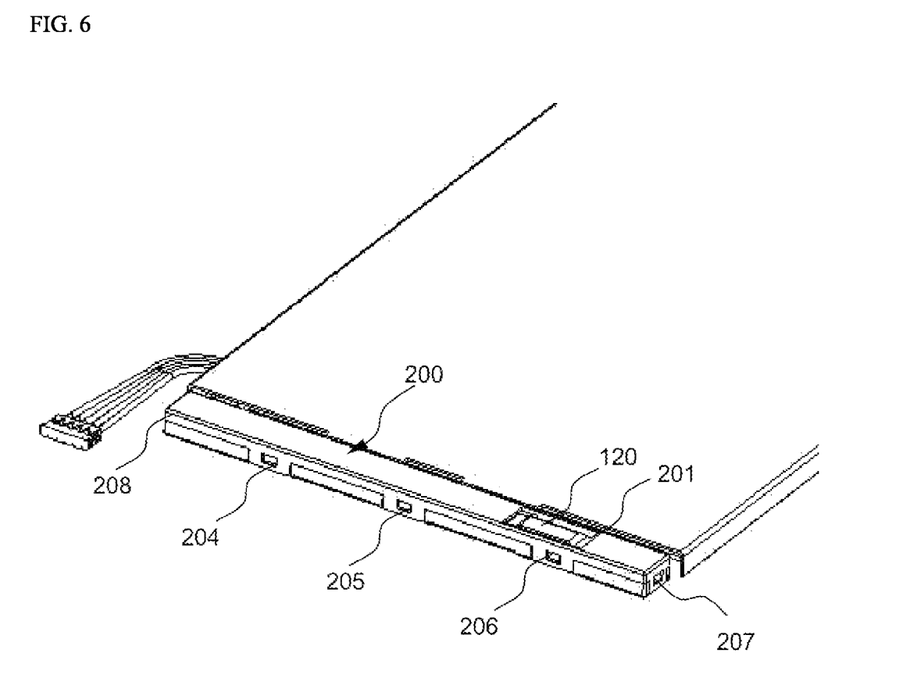
FIG. 6 is a partial perspective view showing the PCB and the safety element of FIG. 4 mounted to first and second cases.
Figure 7:
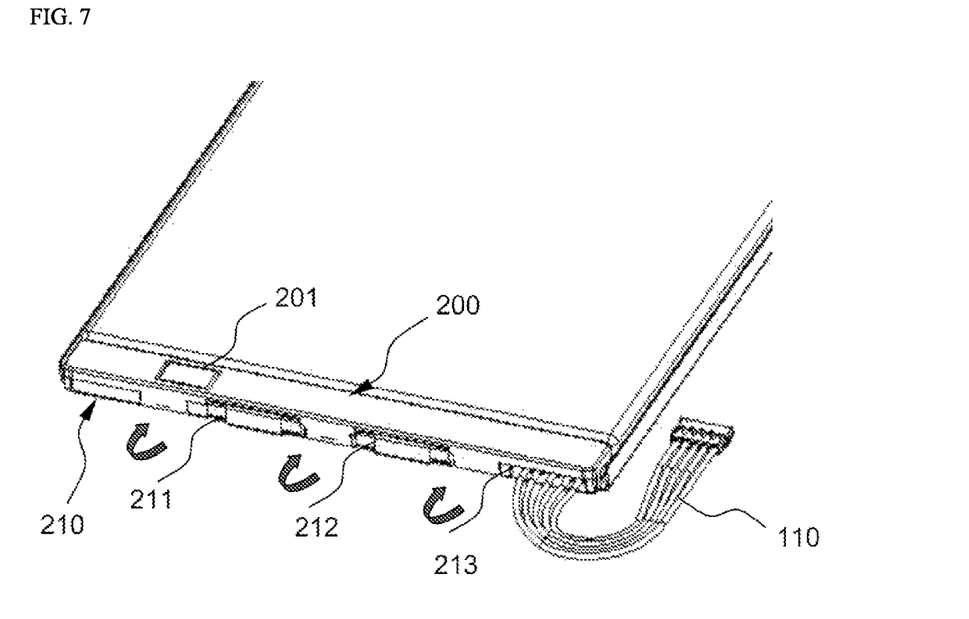
FIG. 7 is a typical view showing a process of loading a protection circuit module (PCM) of FIG. 6 on a thermally welded surplus portion of the battery cell.

FIG. 5 is a partial perspective view showing the PCB and the safety element of FIG. 4 mounted to a second case, FIG. 6 is a partial perspective view showing the PCB and the safety element of FIG. 4 mounted to first and second cases, and FIG. 7 is a typical view showing a process of loading a PCM (protection circuit module) of FIG. 6 on the thermally welded surplus portion of the battery cell.

Referring to these drawings, a first case 200 and a second case 210 are coupled to cover the PCB 100 and the safety element 120.

The second case 210 includes holes 211 and 212, through which the electrode terminals 11 and 12 of the battery cell are inserted, and a hole 213, through which the external input and output terminal 110 extends outward.

Also, the first case 210 is provided with an opening 201, through which the safety element 120 is exposed outward. Consequently, the installation of the first case 210 does not cause the increase of total height, and it is possible for the safety element 120 to sensitively react to the change in temperature of the battery cell 10 although the safety element 120 is covered by the first case 200 and the second case 210.

Therefore, in a state in which the electrode terminals 11 and 12 of the battery cells are inserted through the corresponding holes 211 and 212, the external input and output terminal 110 extends outward through the hole 213, and the safety element 120 is exposed through the opening 201, the PCB 100 and the safety element 120 are mounted between the first case 200 and the second case 210 to constitute a PCM 300.

The first case 200 and the second case 210 are configured to have an assembly type fastening structure, by which the first case 200 and the second case 210 are coupled to each other.

Specifically, the assembly type fastening structure is constituted by fastening protrusions 214, 215, 216, 217 and 218 (some being not shown) formed at the vertical-direction outer circumferential side of the second case 210 and fastening holes 204, 205, 206, 207 and 208 (some being not shown) formed at the vertical-direction outer circumferential side of the first case 200 so that the fastening holes 204, 205, 206, 207 and 208 correspond to the fastening protrusions 214, 215, 216, 217 and 218 (some being not shown).

After the PCB 100 and the safety element 120 are mounted to the second case 210, therefore, assembly of the first case 200 and the second case 210 is achieved by coupling between the fastening protrusions 214, 215, 216, 217 and 218 (some being not shown) and the fastening holes 204, 205, 206, 207 and 208 without using additional members.

Also, the PCM 300, in which the PCB 100 and the safety element 120 are mounted between the first case 200 and the second case 210, is loaded on the thermally welded surplus portion 13 of the battery cell 10. As compared with a conventional secondary battery pack, therefore, durability and moisture resistance of the secondary battery pack according to the present invention are considerably improved, thereby effectively protecting the PCM, considerably reducing the number of parts, and greatly improving manufacturing processability.

Figure 8:
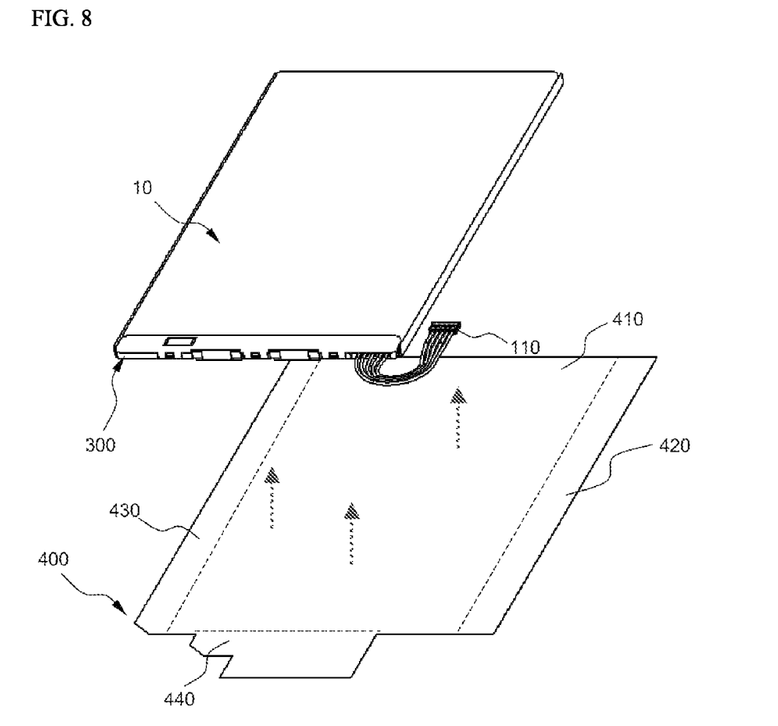
FIGS. 8 to 10 are typical views showing a process of attaching a label.
Figure 9:
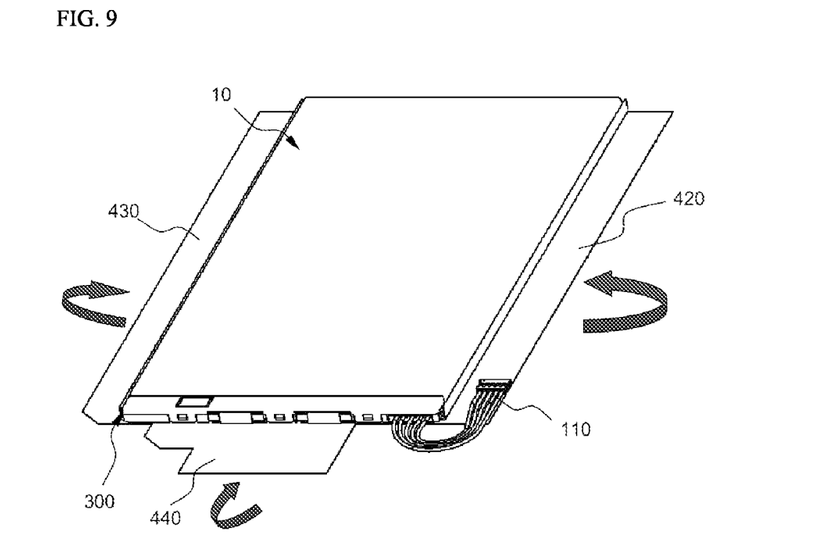
Figure 10:
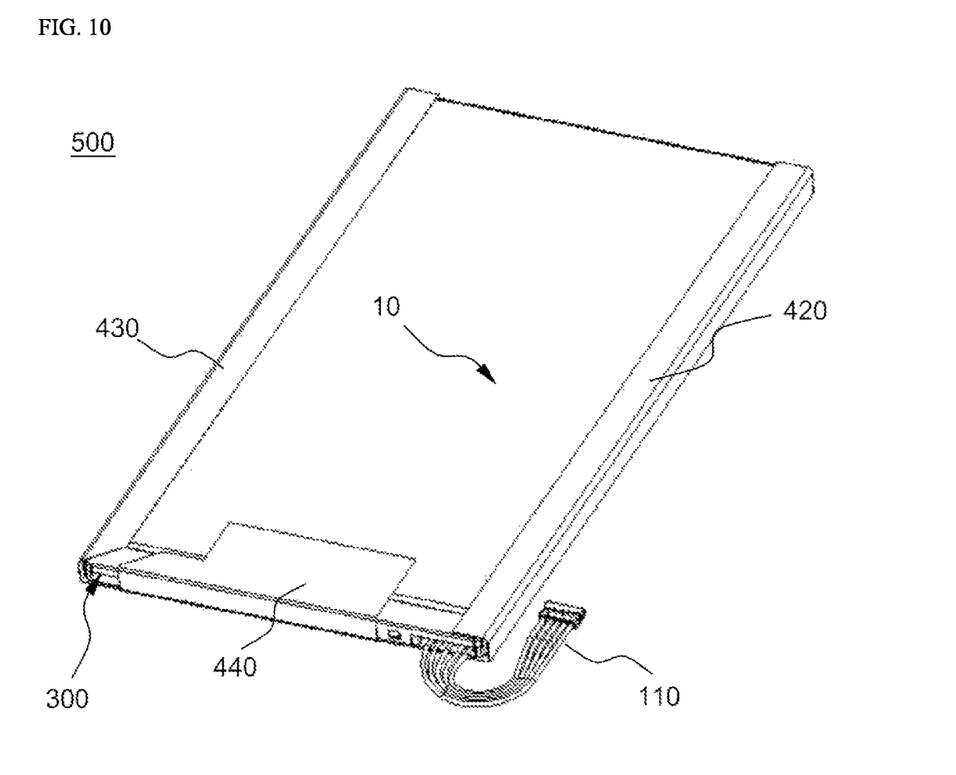

FIGS. 8 to 10 are views typically showing a process of attaching a label 400 to the battery cell manufactured as shown in FIG. 7.

Referring to these drawings, the label 400 is configured to have a sheet structure including a first attachment surface 410 to cover one major surface of the battery cell 10, second and third attachment surfaces 420 and 430 extending from the first attachment surface 410 to cover opposite lateral surfaces of the battery cell 10, and a fourth attachment surface 440 extending from the first attachment surface 410 to cover the PCM 300.

Consequently, one major surface of the battery cell 10 is positioned on the first attachment surface 410, the second and third attachment surfaces 420 and 430 are bent and attached to opposite lateral surfaces of the battery cell 10 so that the second and third attachment surfaces 420 and 430 cover the opposite lateral surfaces of the battery cell 10, and the fourth attachment surface 440 is bent so that the fourth attachment surface 440 covers the PCM. In this way, the label 400 is attached to the battery cell 10.

The label 400, which displays product information, more stably secures electrical connection between electrode terminals of the battery cell and a PCB while maintaining an insulated state at the opposite lateral sides as well as the outer side of the battery cell 10.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery pack comprising:
a battery cell having electrode terminals, including a cathode terminal and an anode terminal;
a first safety element electrically connected to the battery cell via one of the electrode terminals;
a printed circuit board having a terminal connection part; and
a first case and a second case each independently having an open face, a first face opposite the open face and a side face depending from a perimeter of the first face,
wherein the first case and the second case are coupled to each other so that the open faces of the first case and the second case are opposite to each through an assembly type fastening structure, the printed circuit board being disposed in a space defined through the open faces and the side face,
wherein the first case has openings for electrode terminals and a plurality of protrusions extending outwardly from the side face,
wherein the side face of the second case overlies the side face of the first case, the side face of the second case having openings to receive the protrusions on the first case when the side face of the second face overlies the side face of the first case,
wherein the first case and the second case, in which the printed circuit board is disposed, are mounted to an end of the battery cell, and
wherein the second case has on has an opening over the first safety element.

2. The secondary battery pack according to claim 1, wherein the printed circuit board has a protection circuit.

3. The secondary battery pack according to claim 1, wherein the first safety element is a positive temperature coefficient (PTC) element, a fuse, or a bimetal element.

4. The secondary battery pack according to claim 1, wherein the battery cell is a plate-shaped battery cell, and the anode terminal and the cathode terminal are plate-shaped conductive members.

5. The secondary battery pack according to claim 1, wherein the second case is provided with openings for the electrode terminals.

6. The secondary battery pack according to claim 1, wherein the printed circuit board further comprises an external input and output terminal.

7. The secondary battery pack according to claim 6, wherein the external input and output terminal is formed on the printed circuit board at which the a cathode terminal connection part are formed.

8. The secondary battery pack according to claim 6, wherein the external input and output terminal is formed at a face of the printed circuit board opposite a cathode terminal connection part.

9. The secondary battery pack according to claim 6, wherein the second case comprises openings, through which the electrode terminals of the battery cell and the external input and output terminal extends.

10. The secondary battery pack according to claim 1, further comprising a nickel plate additionally mounted to the cathode terminal connection part of the printed circuit board.

11. The secondary battery pack according to claim 1, wherein the battery cell is configured to have an electrode assembly disposed in a battery case made of a laminate sheet including a metal layer and a resin layer in a sealed state.

12. The secondary battery pack according to claim 1, further comprising a label to cover the battery cell.

13. The secondary battery pack according to claim 12, wherein the label is configured to have a structure to cover sealed outer circumferences of the battery cell and the first and second cases.

14. The secondary battery pack according to claim 13, wherein the label is configured to have a sheet structure comprising a first attachment face to cover a bottom, which is one of opposite major faces, of the battery cell, second and third attachment faces extending from the first attachment face to cover opposite side faces of the battery cell, and a fourth attachment face extending from the first attachment face to cover the first and second cases.

15. A secondary battery pack comprising:
a printed circuit board having a cathode terminal connection part connected to a cathode terminal and an anode terminal; and
wherein the first case has a top surface, and a front surface extending from an edge of the top surface, and an open surface opposite the top surface,
wherein the second case has a bottom surface covering the open surface of the first case, and a front surface contacting the front surface of the first case,
wherein the front surface of the first case has a plurality of protrusions extending outwardly from the front surface of the first case,
wherein the front surface of the second case overlies the front surface of the first case to form an exterior surface,
wherein the front surface of the second case has a plurality of opening to receive the plurality of protrusions, and
wherein the first case and the second case, in which the printed circuit board is disposed, are mounted to of the battery cell.

16. The secondary battery pack according to claim 15, wherein the first case, the second case or the first case and the second case comprises opening through which electrode terminals of the battery cell and an external input and output terminal of the printed circuit board extend.

17. The secondary battery pack according to claim 15, wherein the first case or the second case is provided with an opening, through which a safety element located in the first and second cases is exposed.

* * * * *